US010221925B2

(12) United States Patent
Pattakos et al.

(10) Patent No.: US 10,221,925 B2
(45) Date of Patent: Mar. 5, 2019

(54) CONICAL PULLEY FOR BELT CVT

(71) Applicants: Manousos Pattakos, Nikea Piraeus (GR); Efthimios Pattakos, Nikea Piraeus (GR); Emmanouel Pattakos, Nikea Piraeus (GR)

(72) Inventors: Manousos Pattakos, Nikea Piraeus (GR); Efthimios Pattakos, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 117 days.

(21) Appl. No.: 15/436,864

(22) Filed: Feb. 20, 2017

(65) Prior Publication Data

US 2017/0261078 A1    Sep. 14, 2017

(30) Foreign Application Priority Data

Mar. 8, 2016    (GB) .................................. 1603940.6

(51) Int. Cl.
*F16H 9/18* (2006.01)
*F16H 55/56* (2006.01)

(52) U.S. Cl.
CPC ............... *F16H 9/18* (2013.01); *F16H 55/56* (2013.01)

(58) Field of Classification Search
CPC ... F16H 55/56; F16H 9/16; F16H 9/14; F16H 9/12; F16H 2009/163
USPC ..................................................... 474/8, 28
See application file for complete search history.

(56) References Cited

U.S. PATENT DOCUMENTS

| 644,702 | A | * | 3/1900 | Brooks | ..................... F16H 9/16 474/31 |
| 824,115 | A | * | 6/1906 | Hearttagen | ............. F16H 55/56 474/8 |
| 1,350,670 | A | * | 8/1920 | Ritter | ........................ F16H 9/16 474/29 |
| 1,664,349 | A | * | 3/1928 | Burrow | ..................... F16H 9/16 474/29 |
| 2,013,268 | A | * | 9/1935 | Douville | ................. F16H 55/56 474/39 |
| 2,107,483 | A | * | 2/1938 | Knight | ...................... F16H 9/14 474/26 |
| 2,152,207 | A | * | 3/1939 | Needham | .................. F16H 9/04 474/27 |
| 2,210,300 | A | * | 8/1940 | Magruder | ............... B08B 9/045 15/104.33 |
| 2,255,567 | A | * | 9/1941 | McElroy | ................... F16H 9/12 474/27 |
| 2,376,154 | A | * | 5/1945 | Kershaw | ................. F16H 55/48 29/37 R |
| 2,499,219 | A | * | 2/1950 | Hemmeter | ................ F16H 9/12 192/224.1 |
| 2,546,856 | A | * | 3/1951 | Frazier | ..................... F16H 9/14 474/27 |

(Continued)

*Primary Examiner* — Henry Y Liu

(57) ABSTRACT

A conical pulley for belt Continuously-Variable-Transmissions allowing a bigger than the width W of the belt maximum axial displacement of the one conical pulley half relative to the other, achieving a bigger than 0.5*W*tan(F) difference between the maximum and the minimum effective radiuses of the belt as it runs on the pulley, wherein F is the angle of the working conical surfaces of the pulley, providing a substantial increase of the transmission gear ratio range that enables faster accelerations at the low gear ratios and better mileage and quieter operation at the high gear ratios.

10 Claims, 19 Drawing Sheets

(56) References Cited

U.S. PATENT DOCUMENTS

| | | | | | |
|---|---|---|---|---|---|
| 2,594,663 | A | * | 4/1952 | Lindell | B23Q 5/16 474/27 |
| 2,595,203 | A | * | 4/1952 | Reeves | F16H 55/56 474/33 |
| 2,741,135 | A | * | 4/1956 | Numan | F16H 55/56 474/33 |
| 2,769,345 | A | * | 11/1956 | Bugenhagen | F16H 9/16 474/29 |
| 2,887,893 | A | * | 5/1959 | Claas | F16H 55/56 137/625.24 |
| 2,892,354 | A | * | 6/1959 | Amonsen | F16H 55/56 474/46 |
| 2,916,024 | A | * | 12/1959 | Dodge | F01P 7/046 123/195 A |
| 4,043,212 | A | * | 8/1977 | Warner | F16H 9/20 474/28 |
| 4,398,899 | A | * | 8/1983 | Wood | F16H 55/56 474/37 |
| 4,504,022 | A | * | 3/1985 | Stang | B65H 51/06 226/175 |
| 4,781,656 | A | * | 11/1988 | Brackett | F16H 9/10 474/29 |
| 5,374,221 | A | * | 12/1994 | Casada | F16H 9/12 474/29 |
| 5,405,158 | A | * | 4/1995 | Wilding | B60B 5/02 280/261 |
| 5,468,191 | A | * | 11/1995 | Monahan | F16H 55/563 474/47 |

\* cited by examiner

CONICAL PULLEY FOR BELT CVT

BACKGROUND ART

In a belt CVT for a car, scooter, ATV etc, an even lower gear ratio at low-gear improves the acceleration, and an even higher gear ratio at high-gear improves the mileage and reduces the noise. This is why the ratio of the higher gear ratio to the lower gear ratio, called Transmission Gear Ratio Range (or TGRR in the following), is important.

The new generation of steel belt CVTs for cars expands the Transmission Gear Ratio Range from the previous 6.0 to the current global top level of 7.0

The need for higher Transmission Gear Ratio Range is even more crucial in trucks, in agricultural tractors, in machinery equipment etc.

SUMMARY OF THE INVENTION

This invention relates with a continuously variable transmission comprising at least:
    a first shaft rotating about a rotation axis;
    a first conical pulley comprising two conical halves on the first shaft, the one conical half of the first conical pulley being displaceable relative to the other conical half of the first pulley along the rotation axis;
    a second shaft,
    a second conical pulley on the second shaft,
    a belt engaging the first conical pulley and the second conical pulley transferring power between the first and second shafts, the belt is running at an effective radius R on the first conical pulley, the effective radius R is varying from a minimum effective radius Ri to a maximum effective radius Ro,
    characterized in that
    the first conical pulley is such that it allows a difference RD between the maximum effective radius Ro and the minimum effective radius Ri bigger than $0.5*W*\tan(F)$, wherein W is an effective width of the belt along the rotation axis, and F is an angle of the first conical pulley.

Each conical pulley half has one or more working conical surfaces created by rotating a generator line about the rotation axis of the conical pulley.

The angle F of the conical pulley is defined as the angle between the rotation axis of the pulley and the generator line.

DETAILED DESCRIPTION

Figure 1:
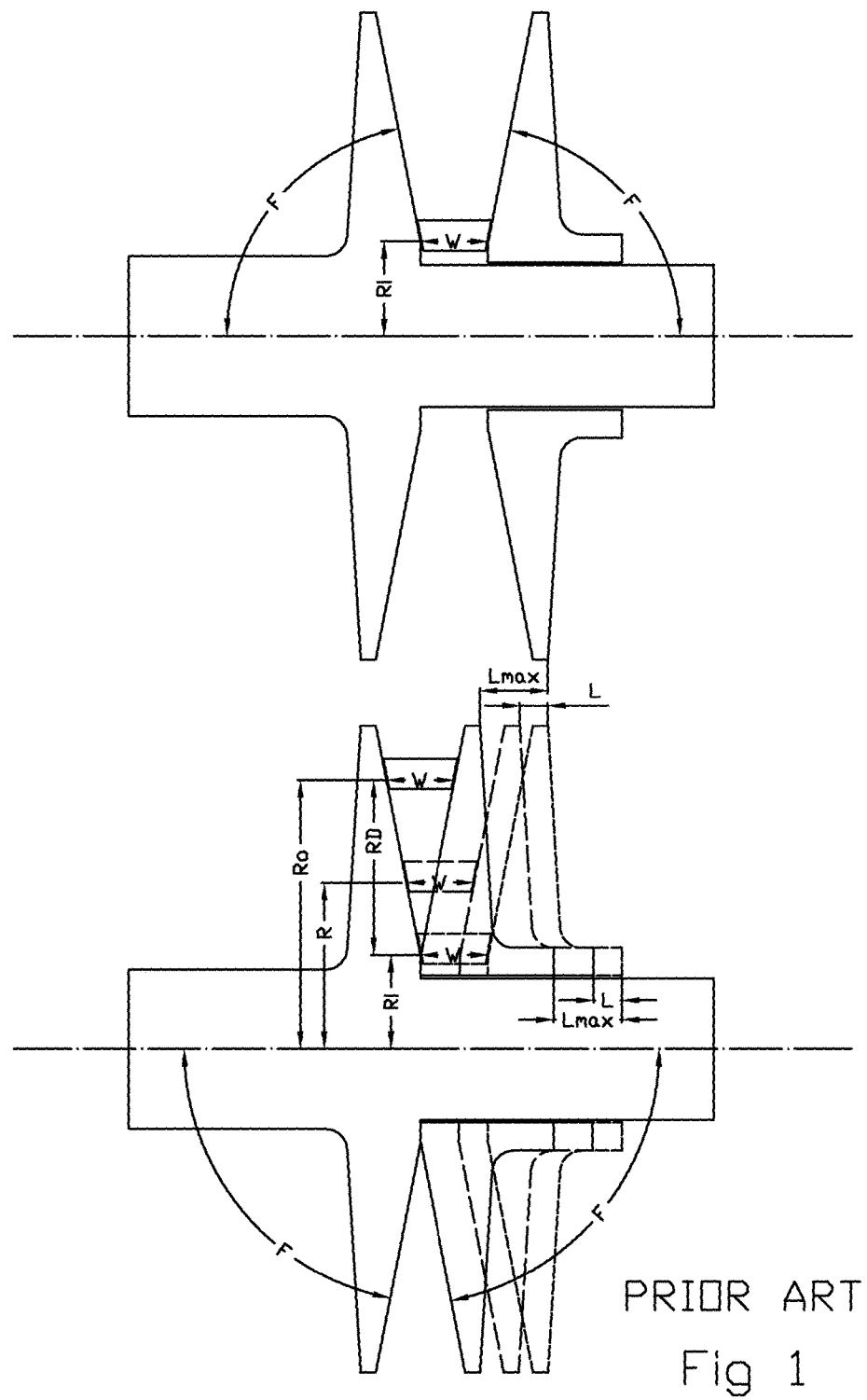
FIG. 1 shows the section of a conical pulley (and of a belt engaged with it) of a conventional CVT. At top the belt is at the lowest radius Ri. At bottom the moving half of the conical pulley and the belt are shown at three different positions/radiuses.
Figure 2:
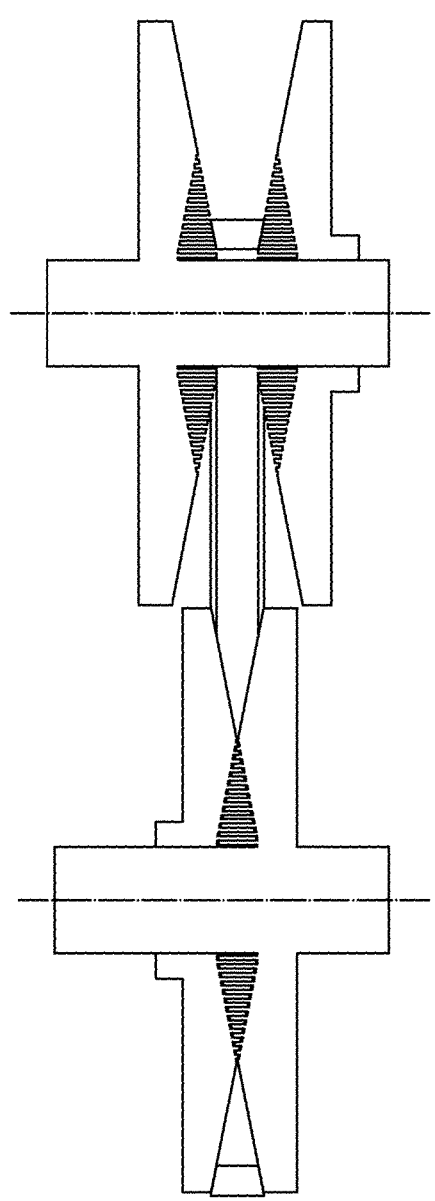
FIG. 2 shows a first embodiment wherein the section of each conical half of each pulley comprises a "comb" shape part allowing the one conical-pulley-half to enter into its mate conical-pulley-half. With the top pulley being the drive pulley, the CVT is shown at its lowest transmission ratio.

FIG. 1 shows the section of a conical pulley of a state-of-the-art CVT by a section plain passing from the rotation axis of the conical pulley shaft. FIG. 1 also shows the section of the belt.

F is the angle between the rotation axis of the conical pulley shaft and the section of the working conical surface of the one conical pulley half by the abovementioned section plain.

At top it is shown the conical pulley with the belt running at the minimum allowed effective radius Ri.

At bottom the moving conical-pulley-half and the belt are shown at three different positions: with continues line are shown the moving conical-pulley-half and the belt at the highest allowed radius Ro, with dashed-line they are shown the conical-pulley-half and the belt running at an intermediate effective radius R, and with more dense dashed-line they are sown the conical-pulley-half and the belt running at the minimum allowed effective radius Ri.

The allowed axial displacement L (L=0 when the belt runs at the minimum allowed radius Ri) of the one conical-pulley-half relative to the other conical-pulley-half is limited by the effective width W of the belt. If an axial displacement L' wider than W is applied to the one conical-pulley-half towards the other conical-pulley-half, it will cause collision of the working conical surfaces of the conical pulley.

That is: the axial displacement L is, at most, W, i.e. Lmax<=W. Given the angle F of the conical pulleys, given the working width W of the belt and given the minimum effective radius Ri wherein the belt is allowed to run on the pulley, the transmission gear ratio range (TGRR) is defined (and limited).

The effective radius R wherein the belt runs is calculated as:

$$R = Ri + 0.5 * L * \tan(F),$$

wherein L is the axial displacement (i.e. the displacement along the rotation axis of the conical pulley shaft) of the one conical-pulley-half relative to the other (with L=0 when the belt runs at the minimum effective radius Ri).

The tan(F) is the tangent of the angle F.

For specific Ri and F, the R gets maximized when the L is maximized, so the maximum possible effective radius Ro at which the belt can run on the conical pulley is:

$$Ro = Ri + 0.5 * Lmax * \tan(F).$$

The maximum allowed radial displacement Ro-Ri of the belt as it cooperates with the conical pulley is:

$$\text{MaximumAllowedRadialDisplacement} = Ro - Ri = 0.5 * Lmax * \tan(F).$$

The maximum pulley ratio Ro/Ri is:

$$\text{MaximumPulleyRatio} = Ro/Ri = 1 + (0.5 * Lmax * \tan(F)/Ri)$$

And supposing similar drive and driven pulleys (which enables the maximum TGRR), the attainable Transmission Gear Ratio Range becomes:

$$\text{TGRR} = \text{MaximumPulleyRatio} - 2 = (1 + (0.5 * Lmax * \tan(F)/Ri)) - 2$$

As explained previously, the Lmax cannot be bigger than W (W is the effective width of the belt), limiting the Transmission Gear Ratio Range to:

$$\text{TGRR} = (1 + (0.5 * W * \tan(F)/Ri)) - 2$$

limiting also the maximum allowed radial displacement RD of the belt to:

$$\text{MaximumAllowedRadialDisplacement} = Ro - Ri = 0.5 * W * \tan(F).$$

For instance, with a minimum radius Ri=50 mm, a conical pulley angle F=79 degrees (i.e. 90 degrees-F=11 degrees) and a belt width W=32 mm:

Ro=132.3

MaximumPulleyRatio=2.65

TGRR=2.65^2=7.0

MaximumAllowedRadialDisplacement=82.3 mm

The present invention enables a substantial increase of the maximum allowed radius Ro, which allows a bigger maximum allowed radial displacement of the belt, which enables a substantially bigger Transmission Gear Ratio Range.

Preferred Embodiments

In a first embodiment, FIGS. 2 to 6, the section (by a plain wherein the rotation axis of the conical pulley lies) of the "conical working surface" of each conical-pulley-half comprises a "comb shaped" part.

The "combs" on the two conical pulley halves are "complimentary": when the belt runs at big radiuses on the pulley, the "rings" formed in the inner part of the one conical-pulley-half enter into respective grooves/recesses made on the other pulley-half and vice-versa. At the big effective radiuses the belt runs as in the conventional conical pulleys.

At the small effective radiuses the belt runs above the grooves made on the two conical halves of the pulley, abutting on the conical ends of the "rings".

Figure 3:
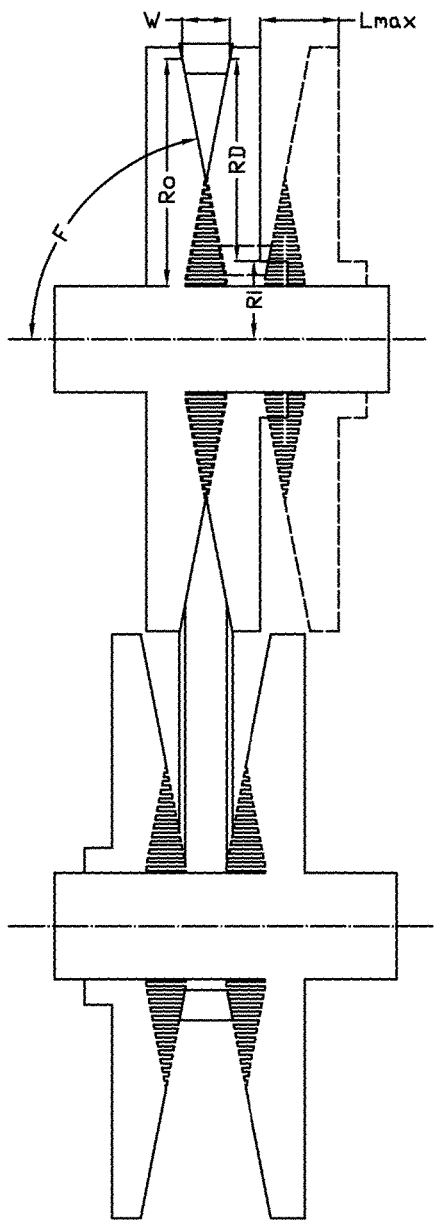
FIG. 3 shows the first embodiment at the highest transmission ratio. By dashed line it is shown the position of the movable conical-pulley-half of the drive pulley (and of the belt) at the lowest transmission ratio (i.e. as in FIG. 2). The maximum axial displacement Lmax of the movable pulley half of the drive pulley is substantially bigger than the effective belt width W.
Figure 5:
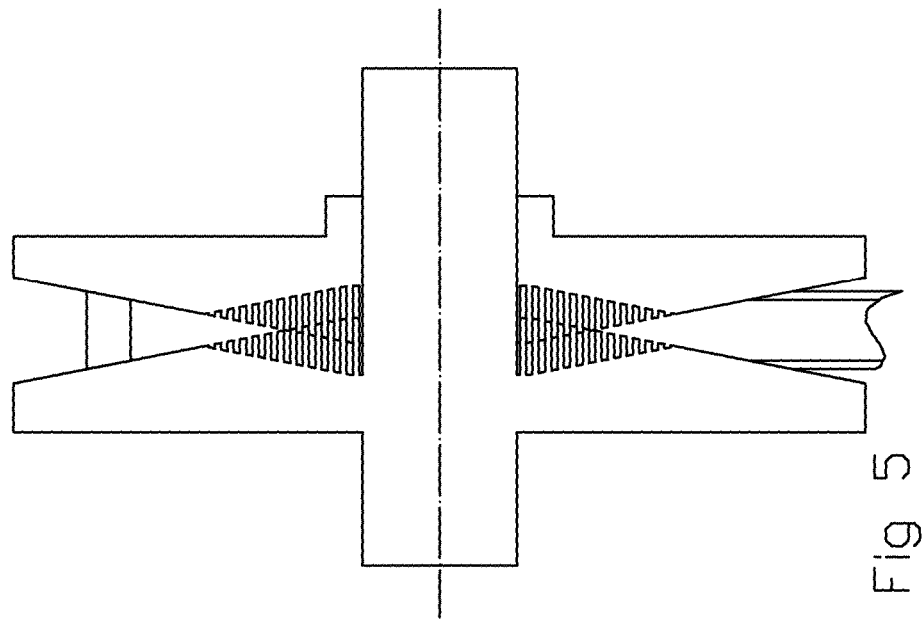
FIG. 5 shows what FIG. 4 with the difference that now the two conical halves are closer to each other (the one enters into the other), with the belt at a big radius.
Figure 4:
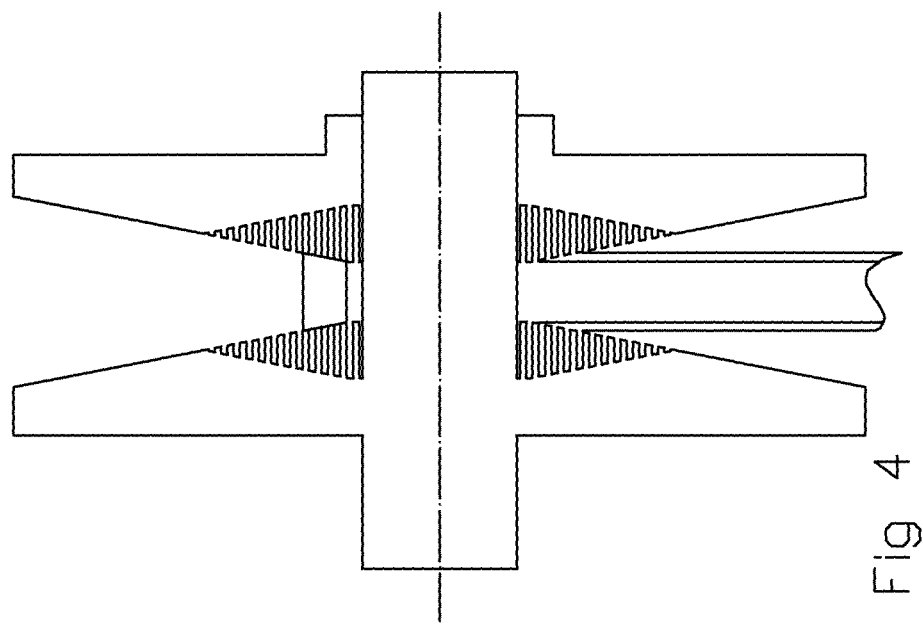
FIG. 4 shows the one only pulley and the belt of the first embodiment at a small radius. The belt is abutting on the "comb" region of the conical pulley halves.
Figure 6:
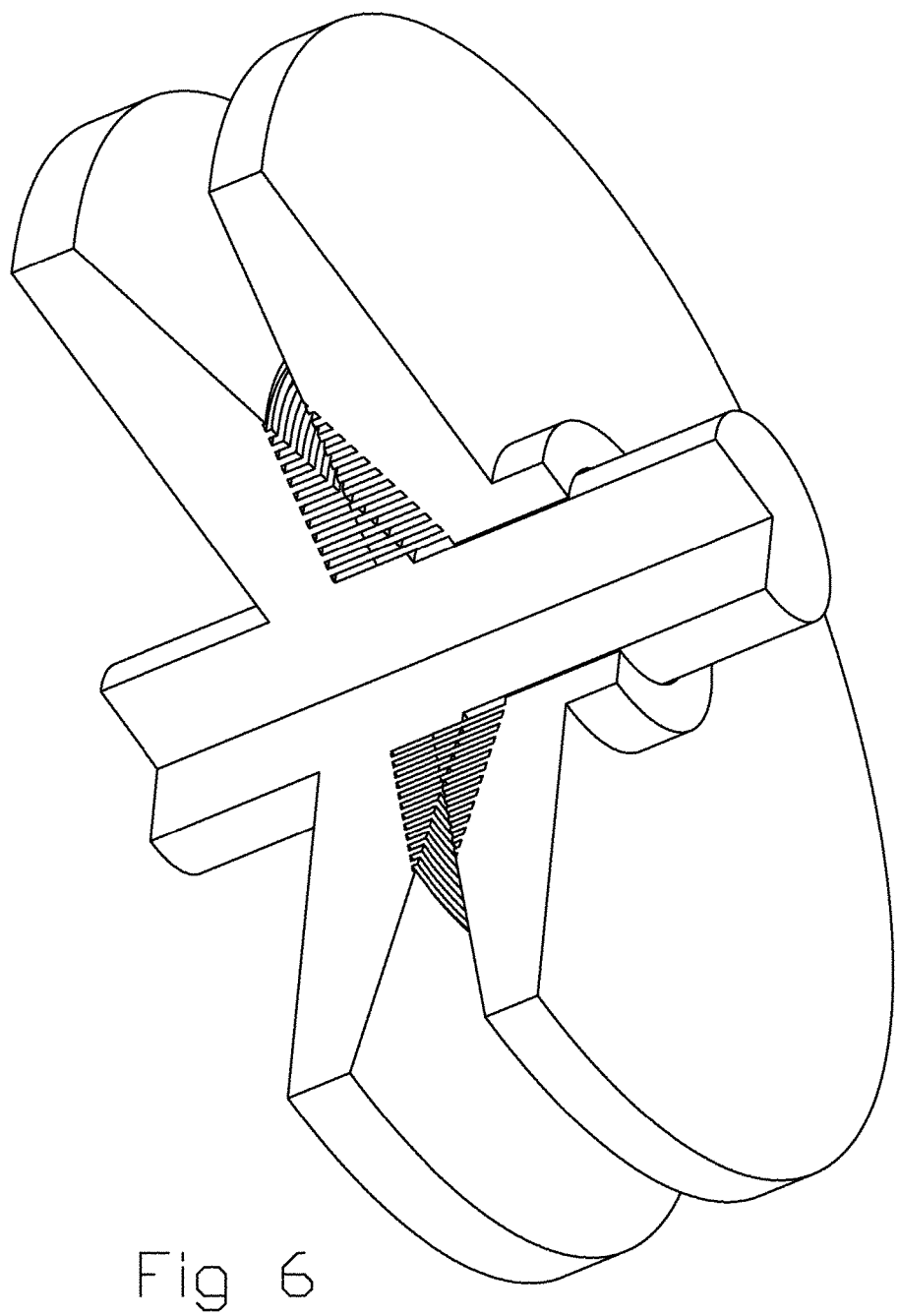
FIG. 6 shows, from a side viewpoint, the one conical pulley half of the first embodiment. The two pulley halves are properly sliced to show more details.
Figure 8:
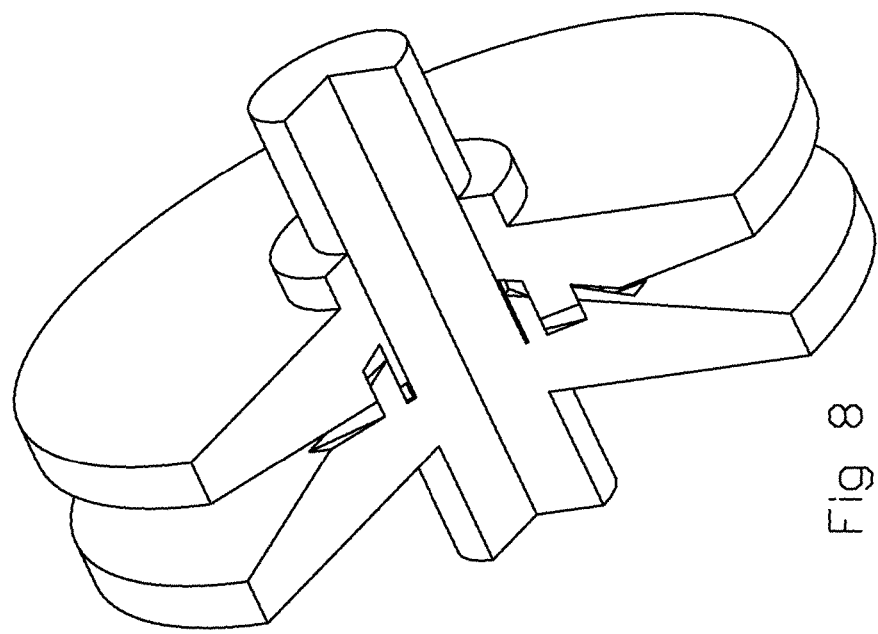
FIG. 8 shows the pulley of FIG. 7 with the two halves close to each other. A portion of the working conical surface of each pulley half enters into grooves cut on the other pulley half.
Figure 7:
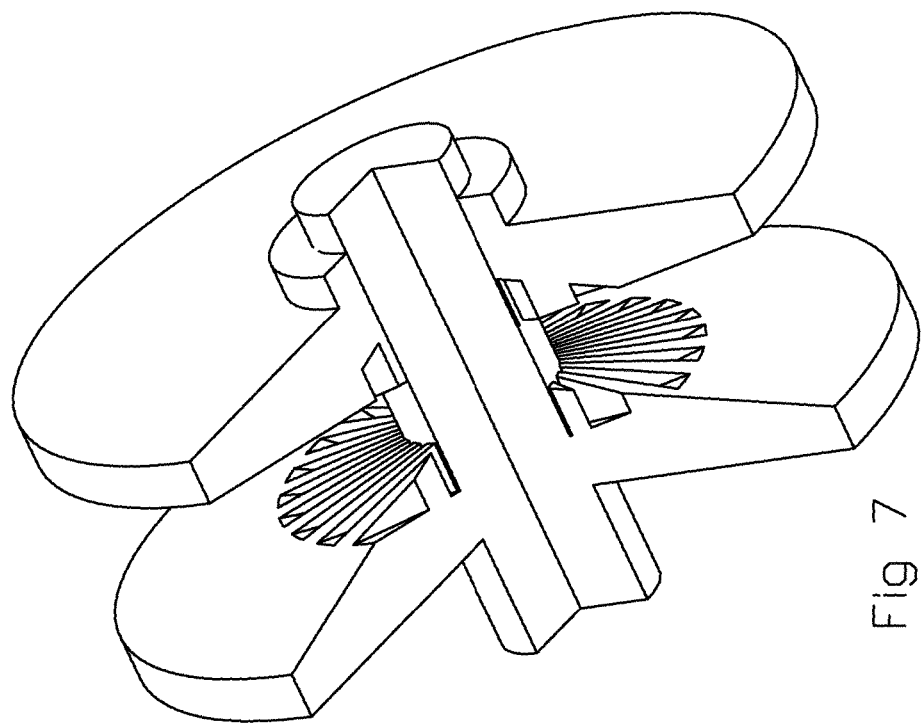
FIG. 7 shows the conical pulley of a second embodiment. The two pulley halves are sliced.
Figure 10:
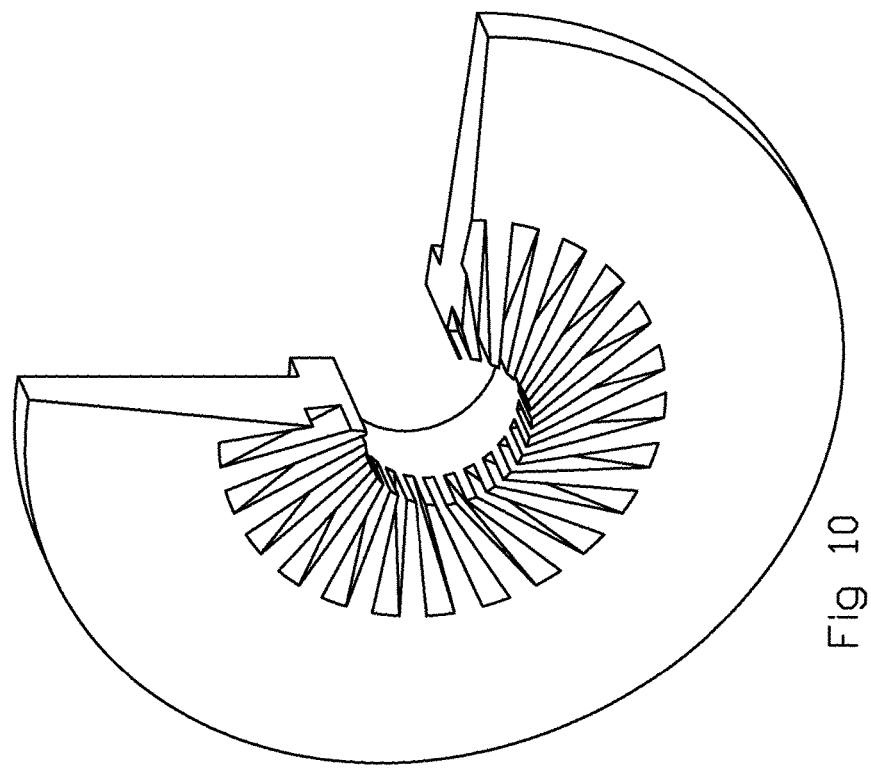
FIG. 10 shows the other conical pulley half of the second embodiment from a side viewpoint.
Figure 9:
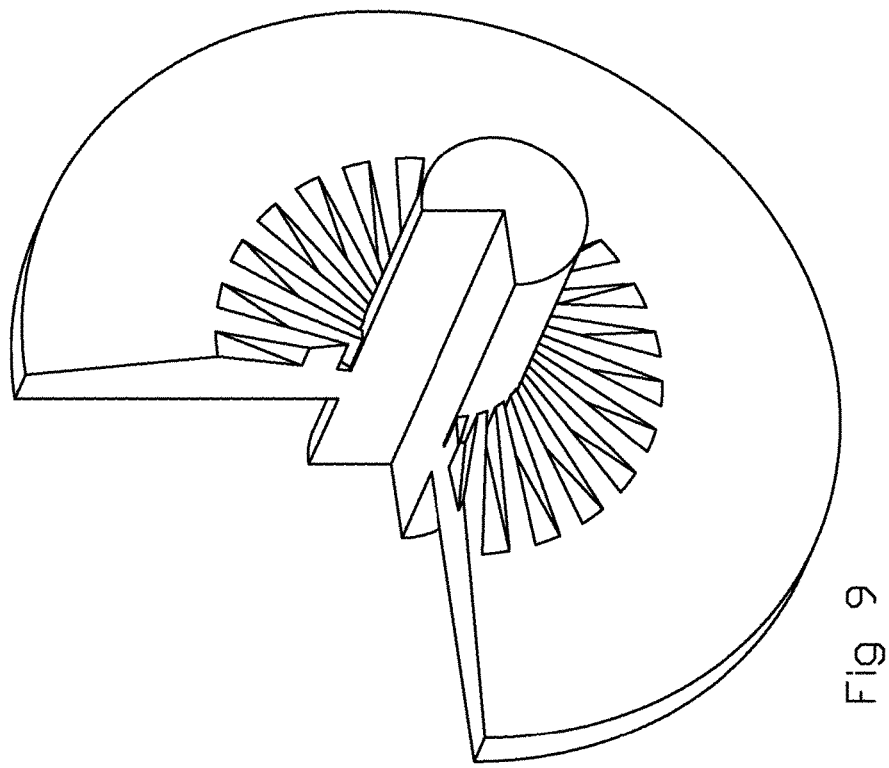
FIG. 9 shows the one conical pulley half of the second embodiment from a side viewpoint.
Figure 12:
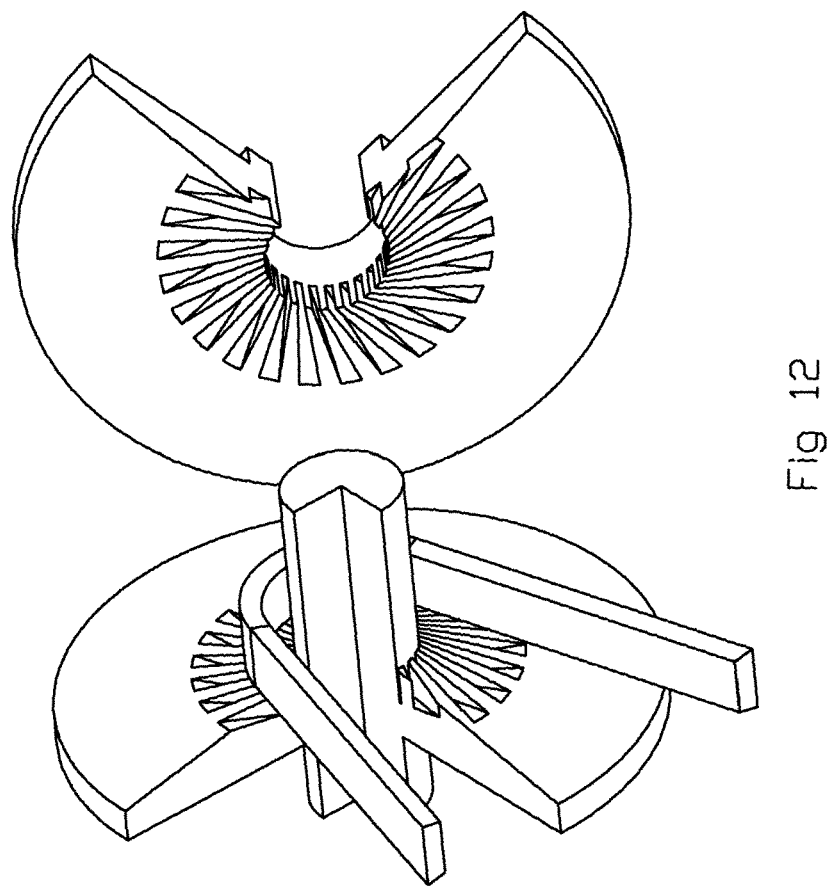
FIG. 12 shows what FIG. 11 with the one conical pulley half moved aside to show how the belt abuts on the other conical pulley half.
Figure 11:
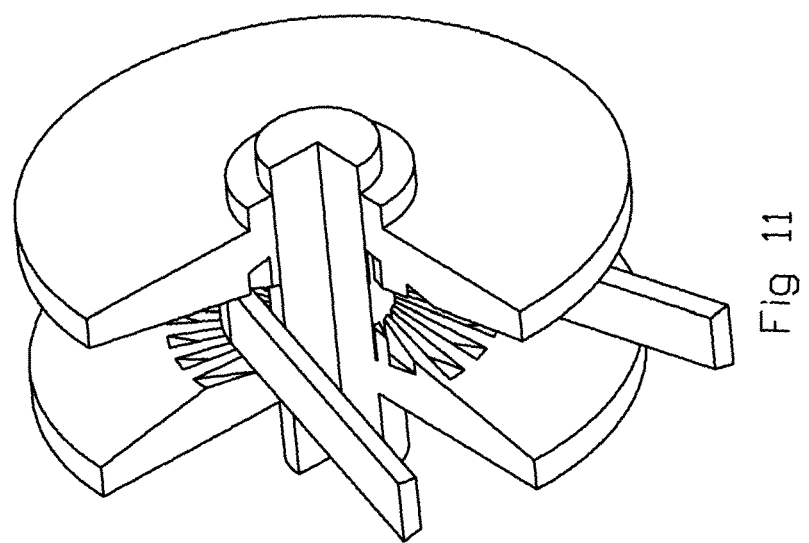
FIG. 11 shows the pulley and a part of the belt of the second embodiment from a side viewpoint.
Figure 13:
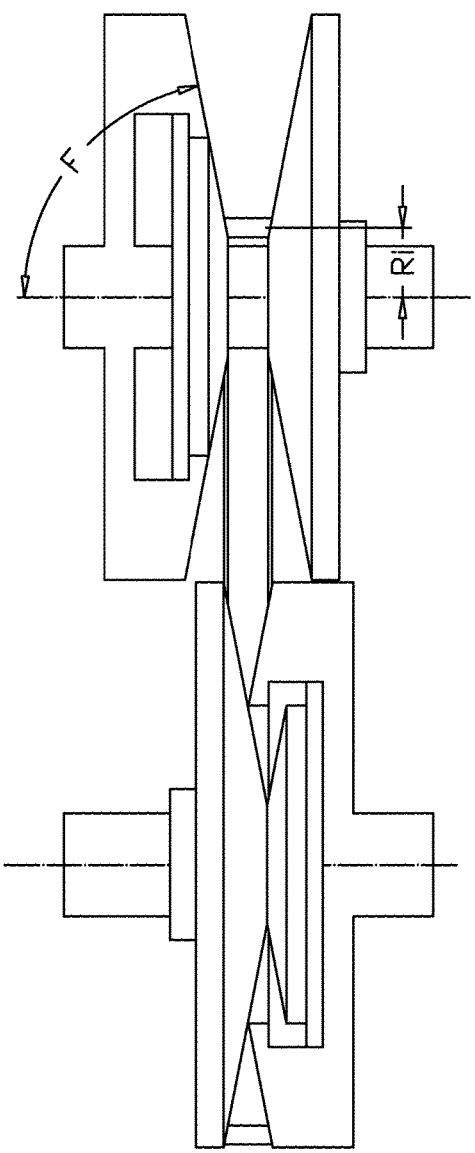
FIG. 13 shows a third embodiment. The belt at the drive pulley, at top, is at its lowest radius Ri. The left half of the drive pulley comprises two sections, the one into the other. The inner section of the left pulley half of the drive pulley is shown locked at its rightmost position relative to the outer section.
Figure 14:
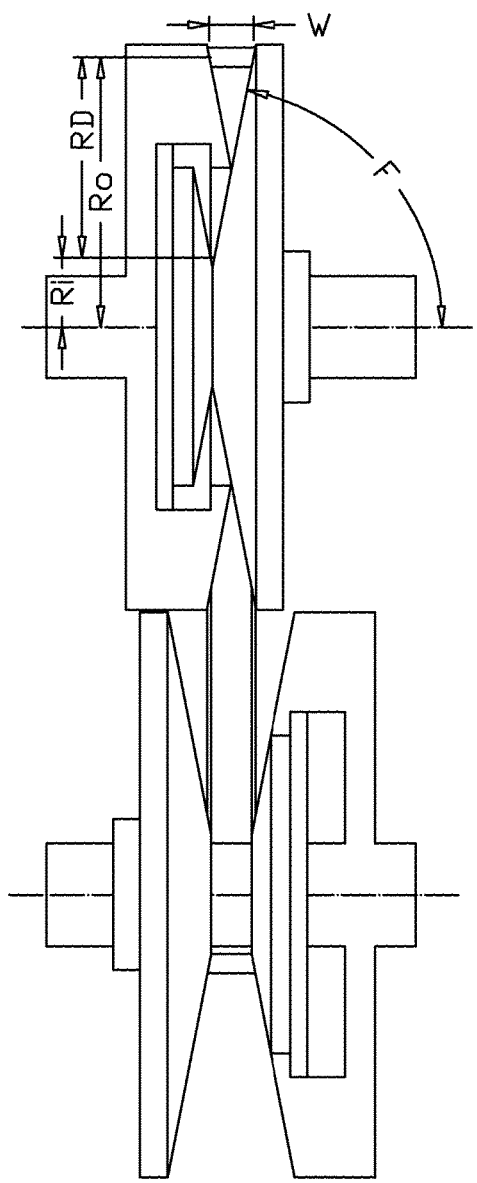
FIG. 14 shows the third embodiment with the belt at the highest radius Ro on the drive pulley (at top). The inner section of the left pulley half of the drive pulley is shown at its leftmost position relative to the outer section.
Figures 15, 16:
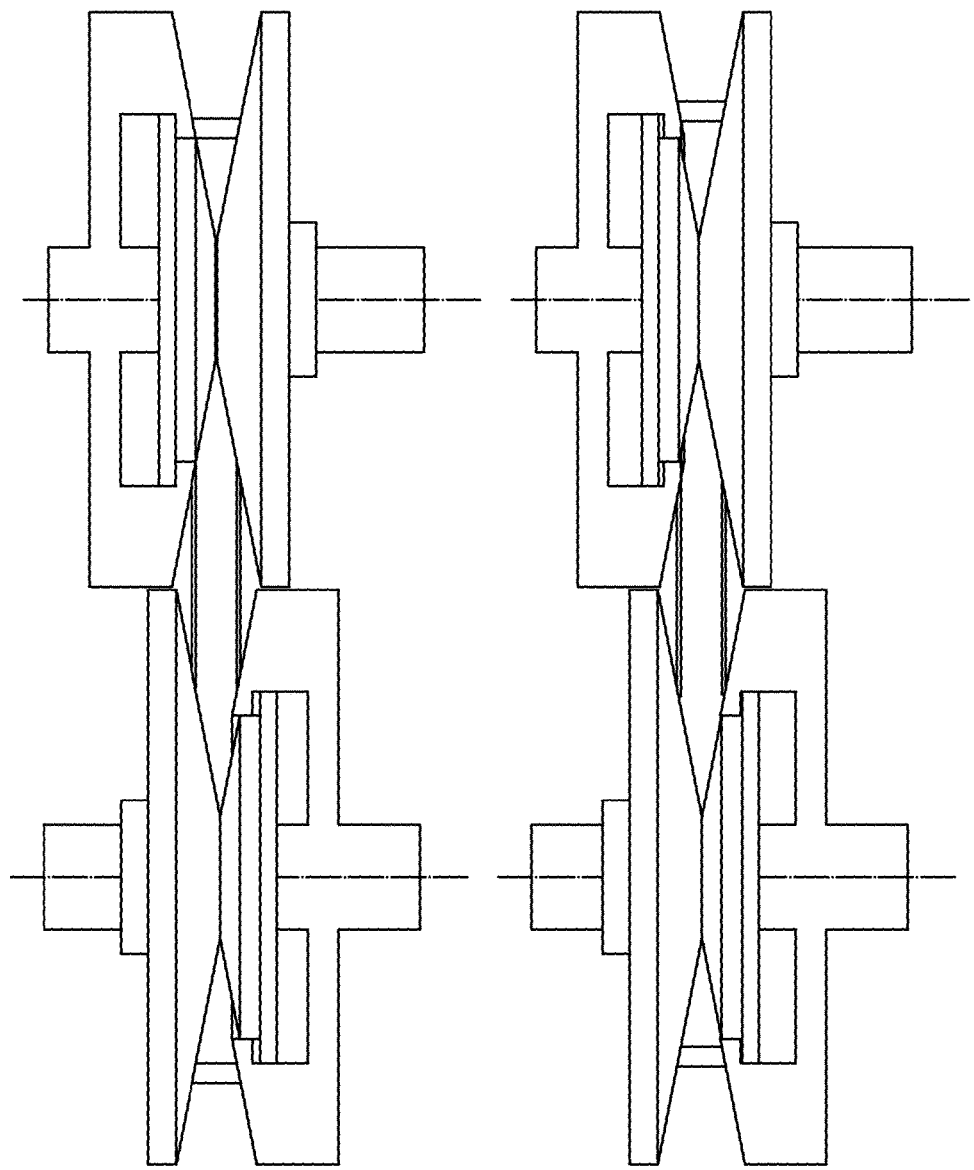
FIG. 15 shows the third embodiment with the belt abutting on the outer section of the left half of the drive pulley. The inner section of the left half of the drive pulley is locked at its rightmost position.
FIG. 16 shows the third embodiment with the belt abutting on the outer section of the left half of the drive pulley, as in FIG. 15, but now the inner section of the left half of the drive pulley is shown slightly displaced to the left relative to outer section.
Figures 17, 18:
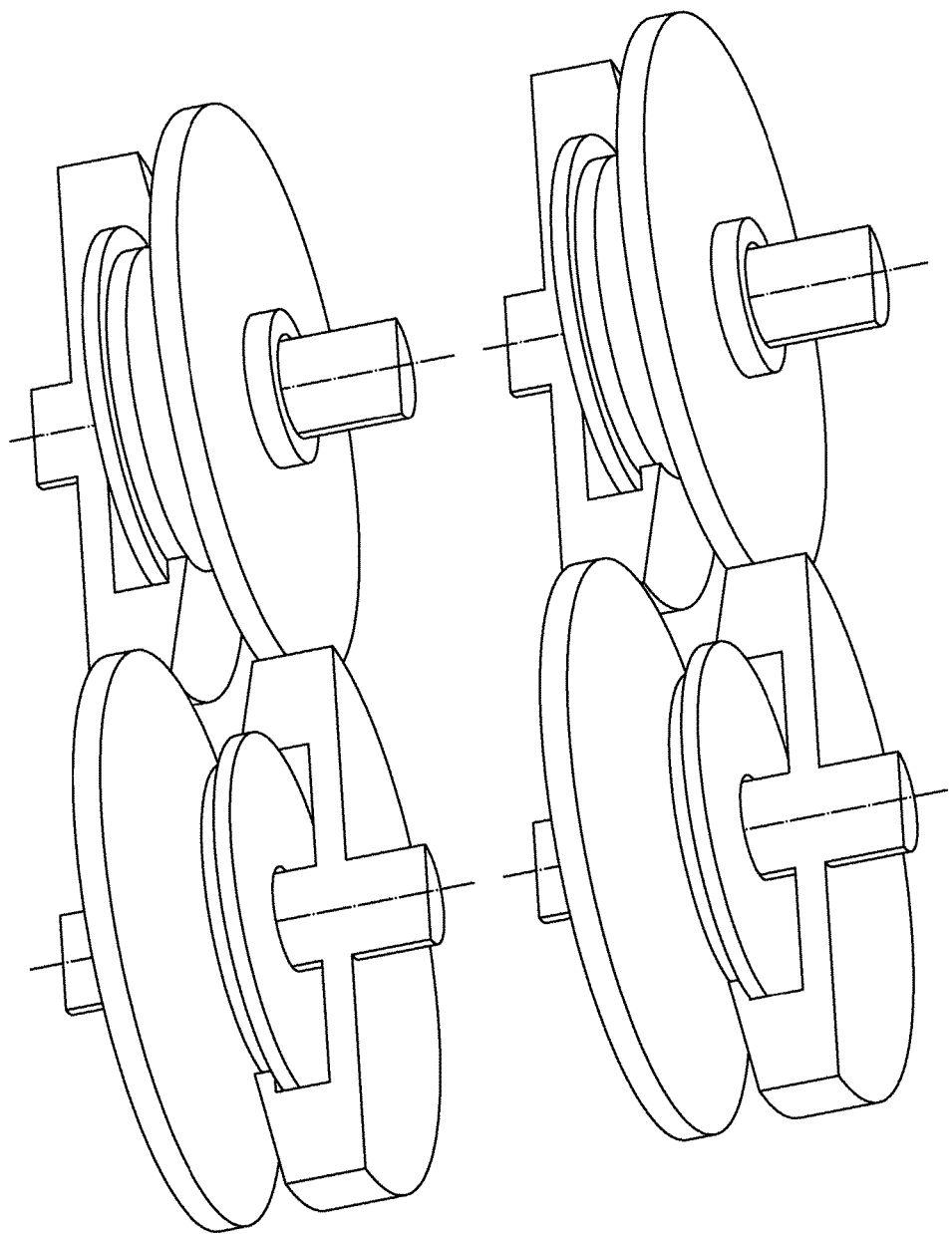
FIG. 17 shows the pulleys of FIG. 15 from a side viewpoint. The outer section of the left half of the drive pulley, the outer section of the right half of the driven pulley and the shafts are sliced to show more details.
FIG. 18 shows the pulleys of FIG. 16 from a side viewpoint. The inner section of the left half of the drive pulley (at top) is slightly displaced to the left.

As shown in FIG. 3 (wherein with dashed line is shown the position of the moveable conical-pulley-half when the belt runs at the minimum allowed radius), the allowed axial displacement L of the moving conical-pulley-half is 1.6 times the effective width W of the belt, which increases the maximum allowed radial displacement RD=Ro−Ri of the belt by 1.6 times and the Transmission Gear Ratio Range by $1.6^2=2.5$ times.

For instance, with "comb" pulleys the world top TGRR goes easily from the present 7.0 to more than 17.0.

With the same belt width W, with the same angle F of the conical surfaces and with the same minimum allowed radius Ri (which defines/limits the maximum torque capacity of the transmission), the new geometry enables a substantially bigger axial displacement of the one conical-pulley-half relative to the other, which provides a substantial increase of the Transmission Gear Ratio Range.

The first embodiment fits with both, continues elastic belts and belts comprising a big number of friction elements (typically of trapezoidal/H shape) connected together via band(s). At the big effective radiuses of the belt, the trapezoidal elements abut on the conical surfaces as in a conventional conical pulley. At the small effective radiuses of the belt, and depending on the height of the friction elements, each friction element passes over one or more grooves of each conical-pulley-half and abuts on the top of one or more "ring".

A bigger height of the belt (height: the "radial" dimension of the belt as it runs around a pulley) allows the belt sides to abut on several "rings" at each conical pulley half, decreasing this way the surface pressure at the small radiuses.

In a second embodiment, FIGS. 7 to 12, each conical pulley half comprises a number of grooves/recesses extending not only peripherally but also in the radial direction. As in the first embodiment, the more the conical halves of the pulley come closer to each other, the more the inner side (i.e. near the rotation axis) of the conical surface of the one conical pulley half enters into the grooves of the other conical pulley half. This arrangement fits better with continues belts (like the elastic belts used in most scooters). When the belt runs at big diameters, there is no difference from the conventional conical pulleys. When the belt runs at small diameters, the belt abuts on several conical sections of each pulley half. In some applications this may prove beneficial because the belt needs to slightly bend, increasing the friction between the belt and the conical surfaces.

In a third embodiment, FIGS. 13 to 18 and 31, the one conical pulley half of the conical pulley comprises two sections, an inner one and an outer one. The two sections are axially displaceable to each other. The inner section comprises a working conical surface S1, the outer section comprises a working conical surface S2. The two conical surfaces S1 and S2 are coaxial (the common axis is the rotation axis of the conical pulley).

At a first position the two conical surfaces S1 and S2 form a combined smooth (stepless) conical surface whereon the belt abuts as it does on a conventional conical surface.

At small radiuses the belt is engaged between the inner conical surface S1 and the opposite conical-pulley-half.

As the effective radius of the belt increases, the belt reaches the limit (the border) between the two conical surfaces S1 and S2; as the effective radius further increases, the belt passes progressively over the limit/border and goes from the inner conical surface S1 to the outer conical surface S2, i.e. the two conical surfaces S1 and S2 must fit/match with each other to allow a smooth transition of the belt from the S1 to S2 (when the effective radius increases) and from the S2 to S1 (when the effective diameter decreases). After the belt has passed the limit/border and abuts exclusively onto the outer conical surface S2, the inner conical surface S1 is displaced axially to make room (space) for the opposite conical-pulley-half, enabling an adequately bigger effective radius and, consequently, a substantial increase of the Transmission Gear Ratio Range.

When with the belt abutting onto the outer conical surface S2 the effective diameter is decreasing and the belt reaches (or is close to reach, or is over) the abovementioned limit/border, the conical surface S1 is displaced and is locked with the S2 conical surface to form a smooth conical passage for the belt.

Figure 19:
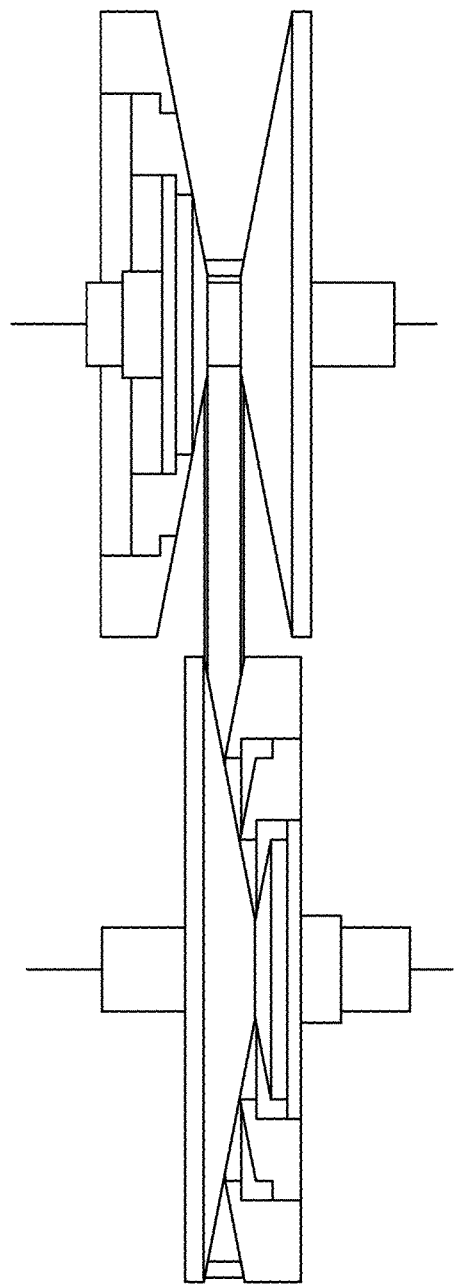
FIG. 19 shows a fourth embodiment wherein the one half of each pulley comprises three sections axially moveable relative to each other. The inner section and the intermediate section of the left half of the drive pulley, at top, are locked at their rightmost position. The belt runs on the inner section of the left half of the drive pulley. The system is at its lowest transmission ratio.
Figure 20:
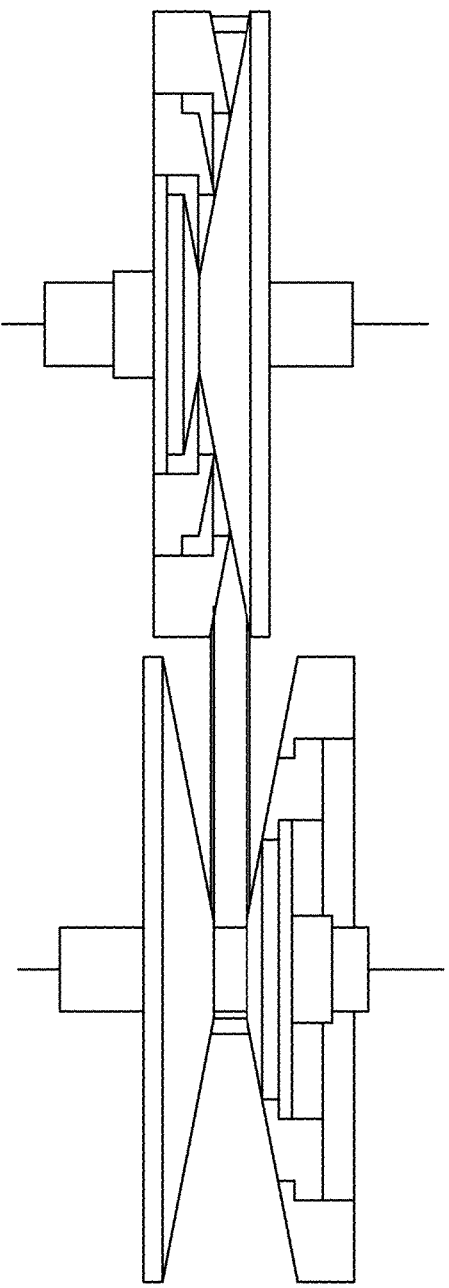
FIG. 20 shows the fourth embodiment at the highest transmission ratio. Now the belt runs on the outer section of the left half of the drive pulley. The intermediate section and the inner section of the left half of the drive pulley are displaced to the left relative to the outer section of the left half of the drive pulley.
Figure 21:
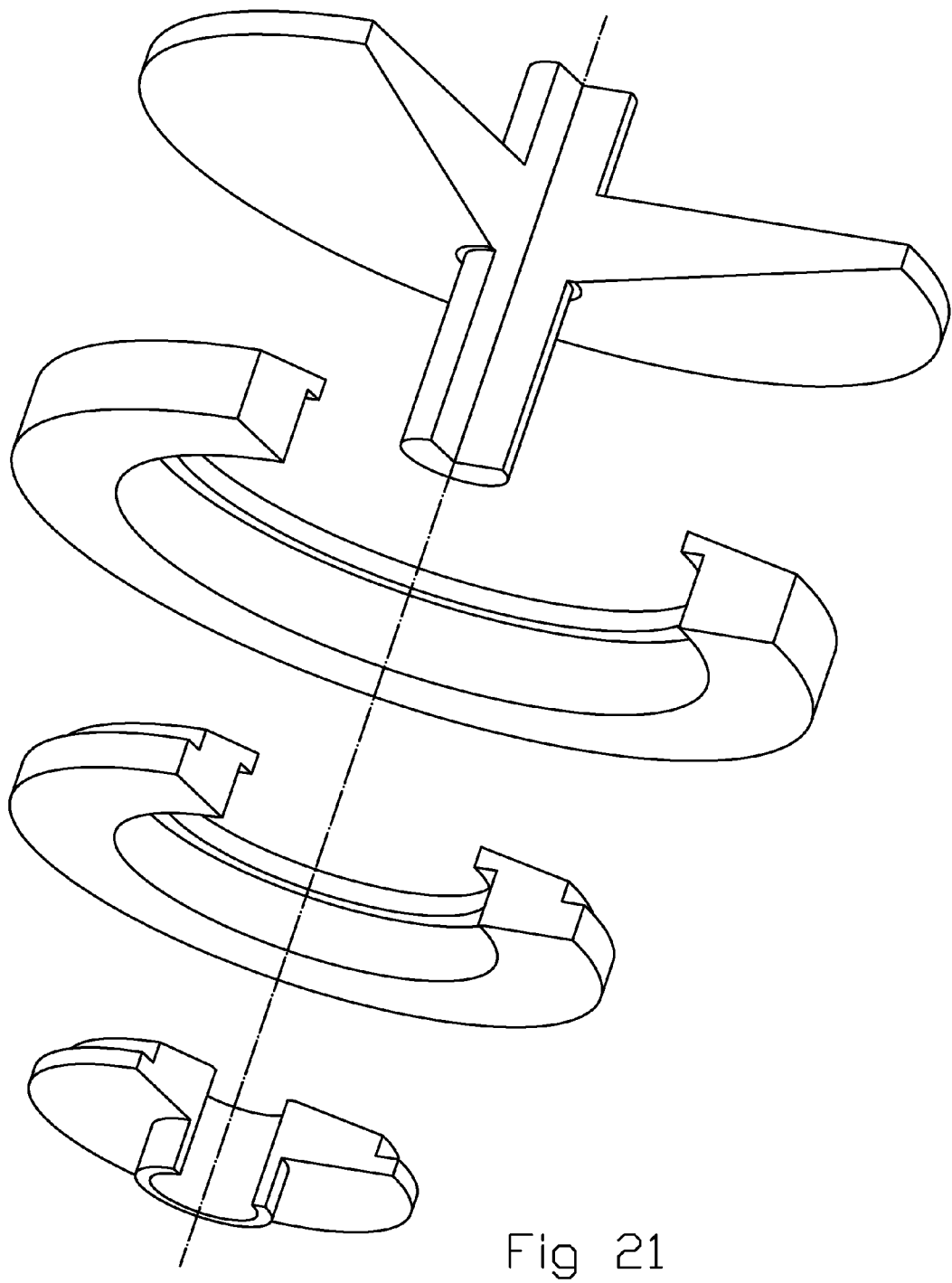
FIG. 21 shows exploded, from a side viewpoint, the one pulley of the fourth embodiment. The parts are properly sliced.
Figure 22:
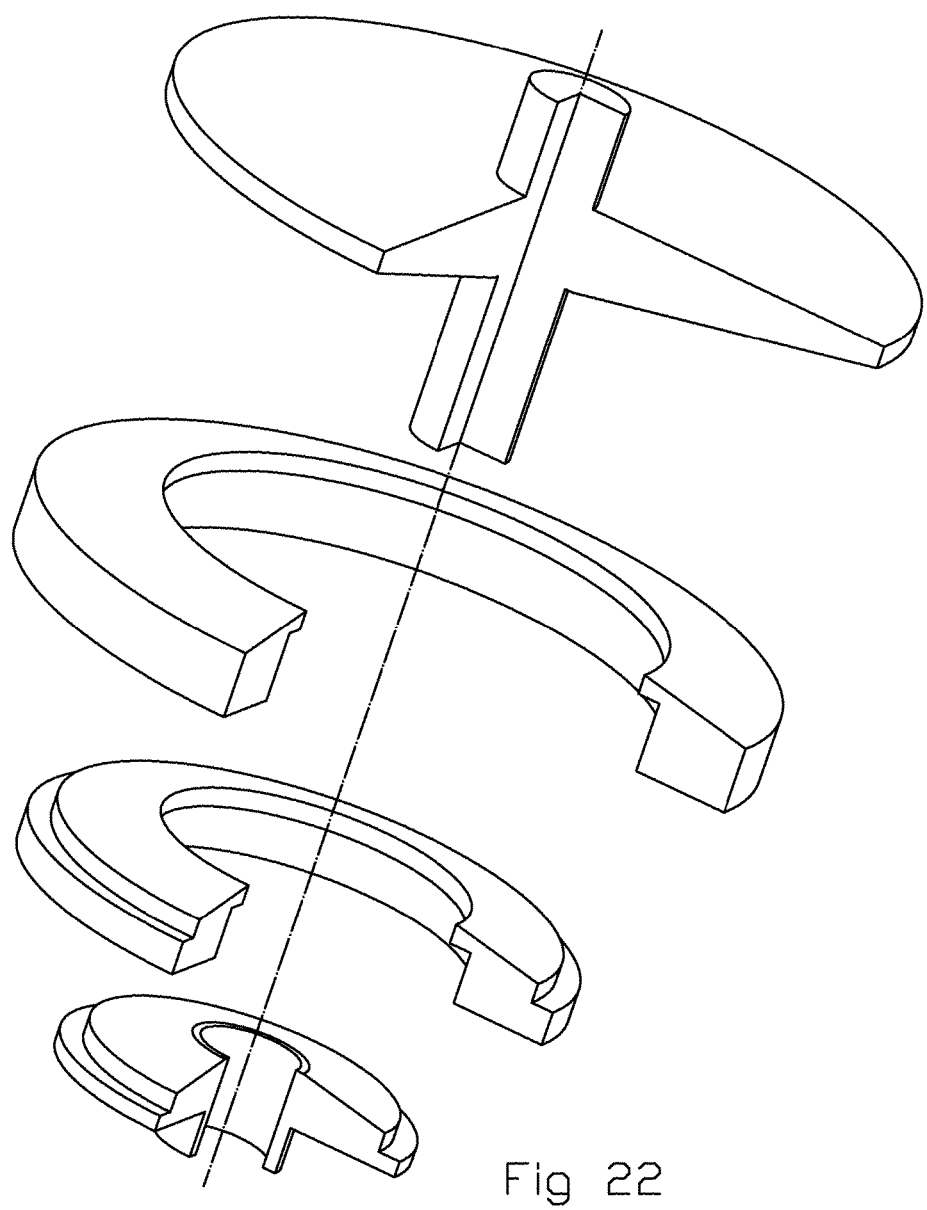
FIG. 22 shows what FIG. 21 from a different viewpoint.

In a fourth embodiment, FIGS. 19 to 22, the one conical-pulley-half comprises three sections axially displaceable to each other, each having a conical surface facing the conical surface of the other conical-pulley-half. The TGRR of the CVT of FIGS. 19 and 20 is more than four times bigger than the TGRR of a conventional CVT having the same effective belt width, the same conical pulley angle and the same minimum effective diameter of the belt, i.e. the 7.0, which is the current world top TGRR, goes to more than 28.0. If desirable, more sections can be used, to further increase the TGRR.

Figure 32:
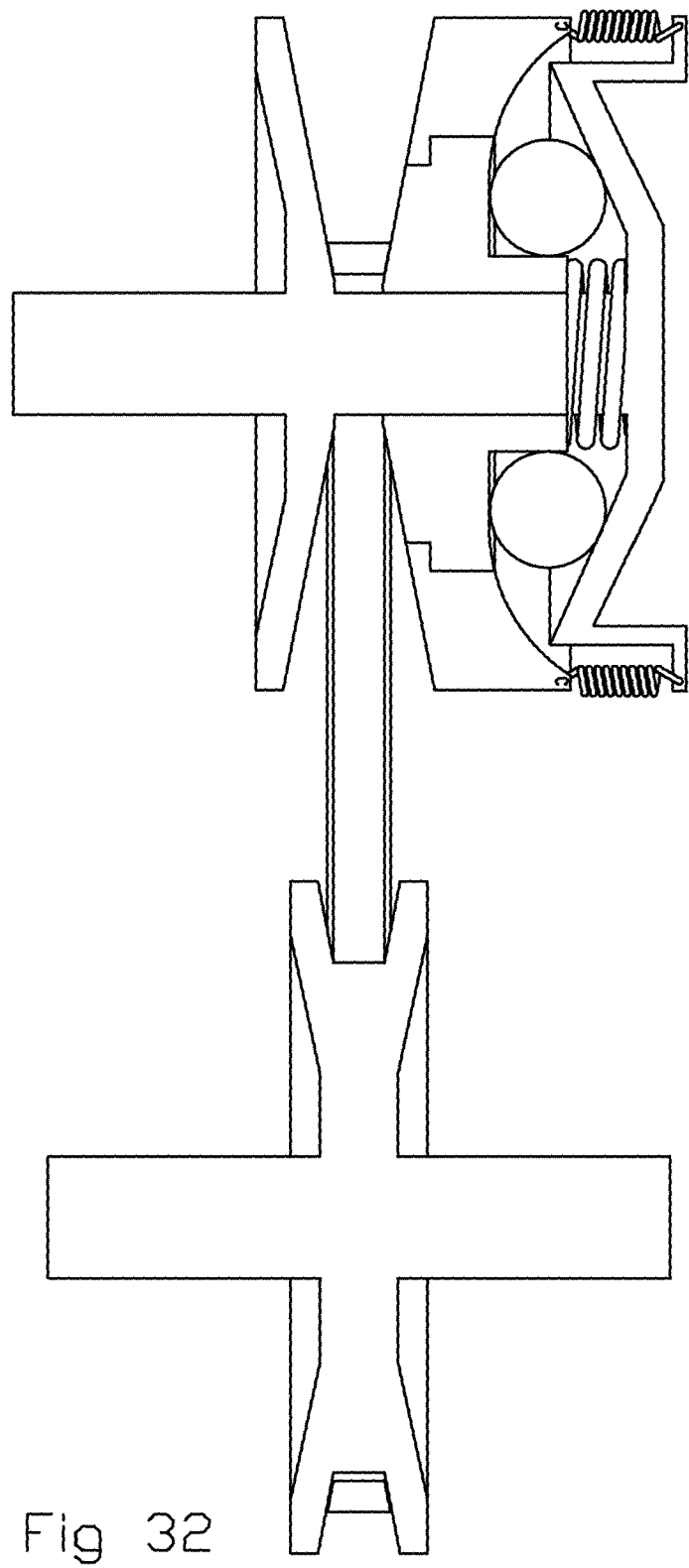
FIG. 32 shows a fifth embodiment wherein the conical pulley at top is variable and the conical pulley at bottom is fixed.

In a fifth embodiment, FIG. 32, a variable conical pulley drives, through the belt, a fixed (the effective radius of the belt is fixed) conical pulley, as in the CVT of some old (Motobecane) mopeds. In this embodiment the distance of the rotation axes of the two pulleys varies to keep the belt in tension. The one half of the drive pulley comprises two sections, each having a conical surface on it.

Control

Regarding the control over the conical-pulley-half with the two, three or more sections (like the embodiments 3 and 4), various control mechanisms can be used, a few of which are presented in the following.

Figure 23:
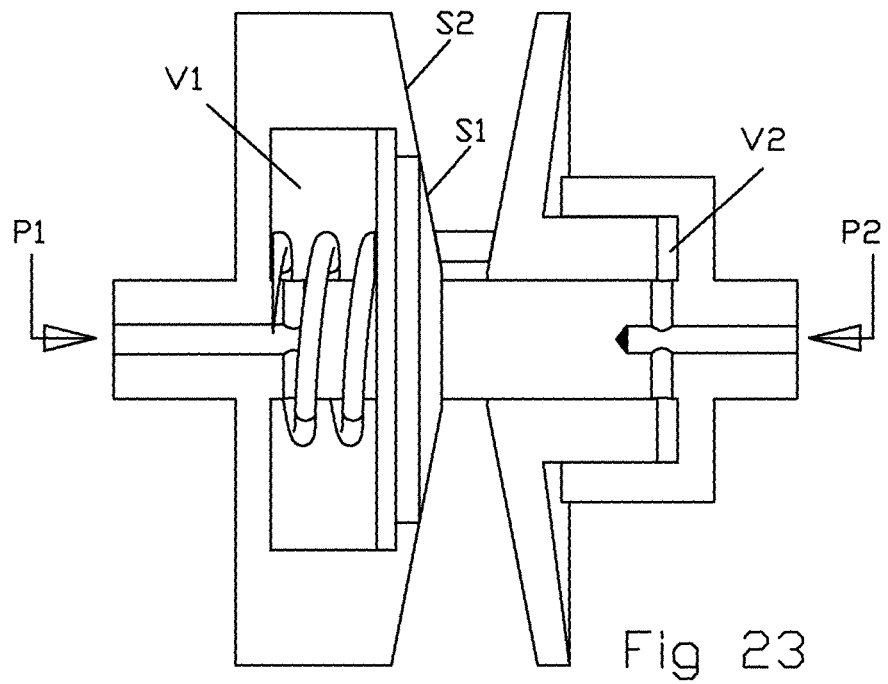
FIG. 23 shows a hydraulic control mechanism for the control of the effective diameter of the belt on the pulleys of the third embodiment. The belt is shown running at a low effective radius. It fits with the existing hydraulically controlled steel belt CVTs of cars.

Hydraulic Control:

In FIG. 23 the belt is at a small radius and runs on the S1 conical surface of the inner section of the left half of the pulley. A restoring spring pushes to the right the inner section of the left half of the pulley. A sealed space V1 behind the inner section contains hydraulic liquid at a pressure P1 that pushes the inner section of the left half of the pulley to the right. Hydraulic liquid at pressure P2 in the sealed space V2 pushes the right half of the pulley to the left. The spaces V1 and V2 are fed with hydraulic liquid through proper passageways in the shaft. The P1 is adequately high to keep the inner section of the left half of the pulley locked at its rightmost position. Adding hydraulic liquid into the space V2, the right half of the pulley moves to the left displacing the belt at bigger radiuses.

Figure 24:
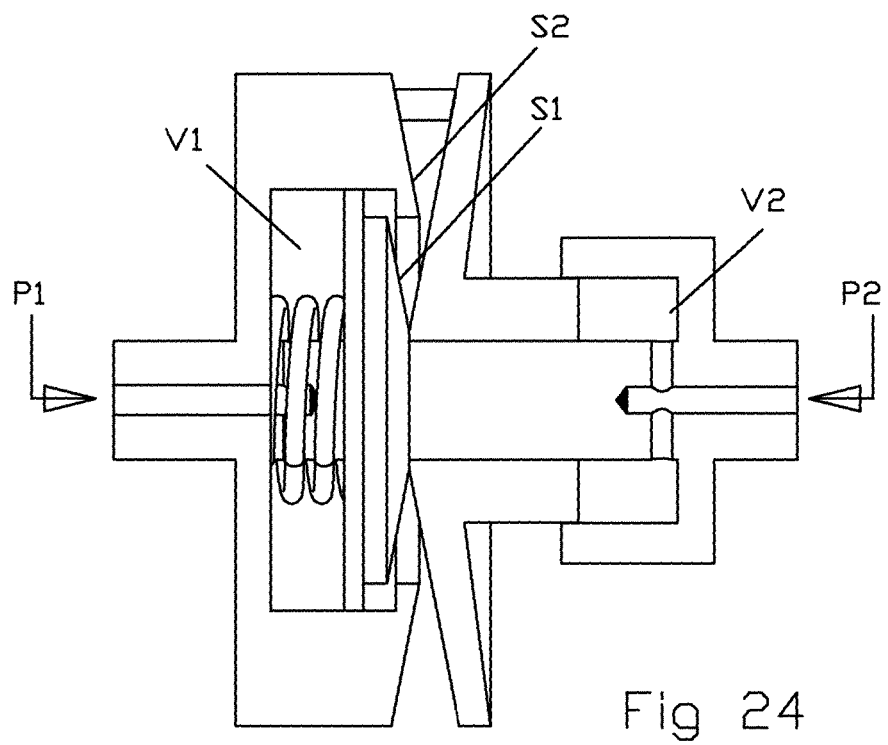
FIG. 24 shows the hydraulic control mechanism of FIG. 23 with the belt running at a high effective radius.

In FIG. 24 the belt runs on the conical surface S2 of the outer section of the left conical half of the pulley. A quantity of hydraulic liquid has been added to the space V2 pressing the right half of the pulley to the left. A quantity of hydraulic liquid has been left to exit from the space V1. The inner section of the left half of the pulley is displaced by the right half of the pulley to the left relative to the outer section of the left half of the pulley, and the restoring spring is compressed.

Figure 25:
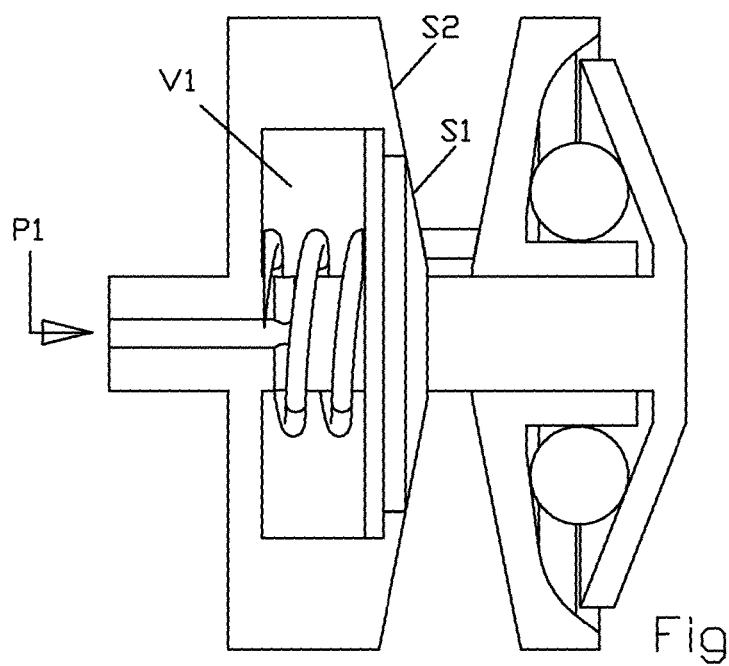
FIG. 25 shows a hydraulic/mechanical control mechanism for the control of the effective diameter of the belt on the drive (preferably) pulley of the third embodiment. The belt runs at a low radius.

Hydraulic/Mechanical Control:

In FIG. 25 the belt is shown at a small radius. The left half of the mechanism is the same as in the mechanism of FIGS. 23 and 24. The right half of the mechanism is a variator (a centrifugal governor) having roller weights moving along ramps. The higher the revs the more the roller weight push the right half of the pulley to the left.

Figure 26:
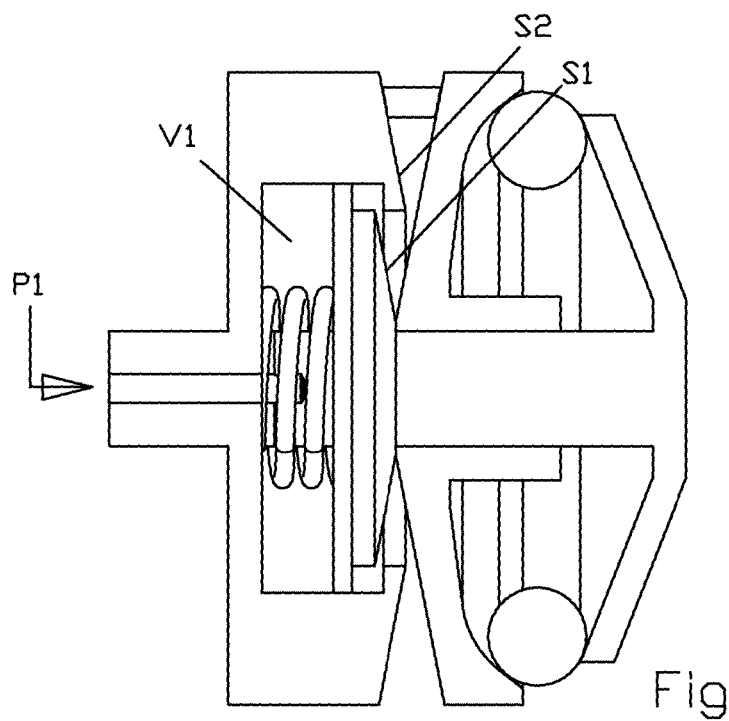
FIG. 26 shows the hydraulic/mechanical control mechanism of FIG. 25 with the belt running at a high radius.

In FIG. 26 the belt has passed from the conical surface S1 to the conical surface S2, a control valve (not shown) allows hydraulic liquid from the space V1 to exit and the inner section of the left half of the pulley, under the action of the right half of the pulley, moves to the left.

Figure 27:
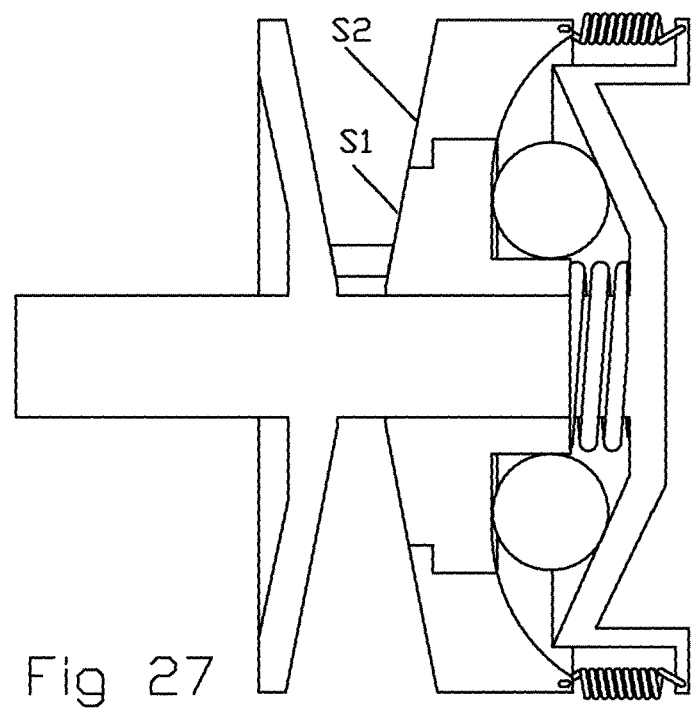
FIG. 27 shows a mechanical control mechanism for the control of the effective diameter of the belt on the drive (preferably) pulley of the third embodiment. The belt runs at the lowest radius.

Mechanical Control:

In FIG. 27 a variator comprises roller weights and ramps. As the revs increase, the roller weights push the inner section of the right half of the pulley to the left. The inner section abutting on the outer section of the right half of the pulley pushes it to the left. As the roller weights move away from the shaft, the radius of the belt increases. The belt passes from the S1 conical surface to the S2 conical surface and the roller weights pass from the inner section to the outer section of the right half of the pulley. Then the inner section of the right half of the pulley, abutting on the left half of the pulley, stops displacing to the left. The outer section of the right half continues its motion to the left.

Figure 28:
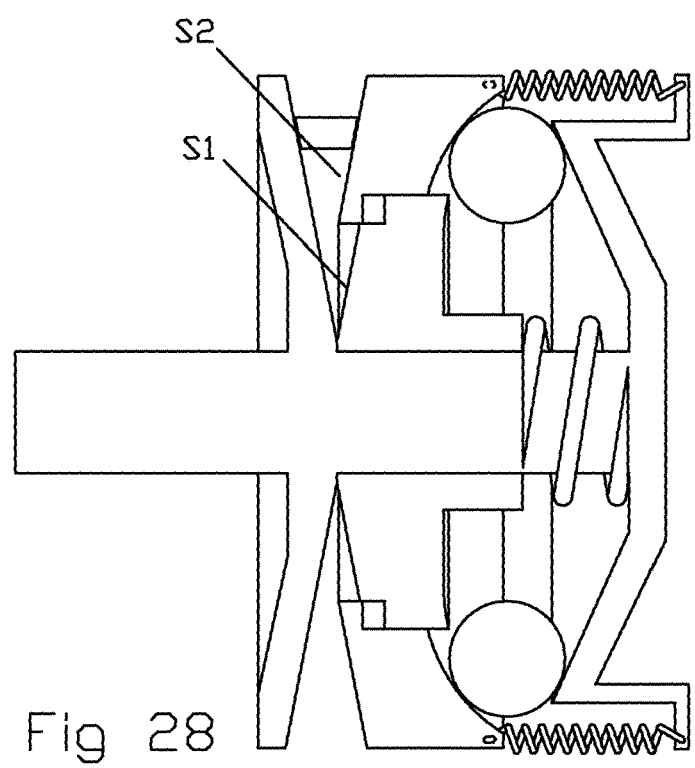
FIG. 28 shows the mechanical control mechanism of FIG. 27 with the belt running at a high radius.

When the revs drop (or the tension of the belt increases) the roller weights move closer to the shaft allowing the outer section of the right half of the pulley to move at right, allowing the belt to run at smaller radiuses (FIG. 28). As the belt runs at smaller and smaller effective radiuses, the outer section abutting on the inner section of the right half of the pulley pushes it to the right. Then the roller weights pass from the outer section to the inner section and then the belt passes from the conical surface S2 to the conical surface S1. The central spring pushes the inner section of the right half of the pulley to the left (necessary when the roller weights do not abut on the inner section). Similarly the side springs pull the outer section of the right half of the pulley to the right (necessary when the roller weights are not abutting on the outer section)

Figure 29:
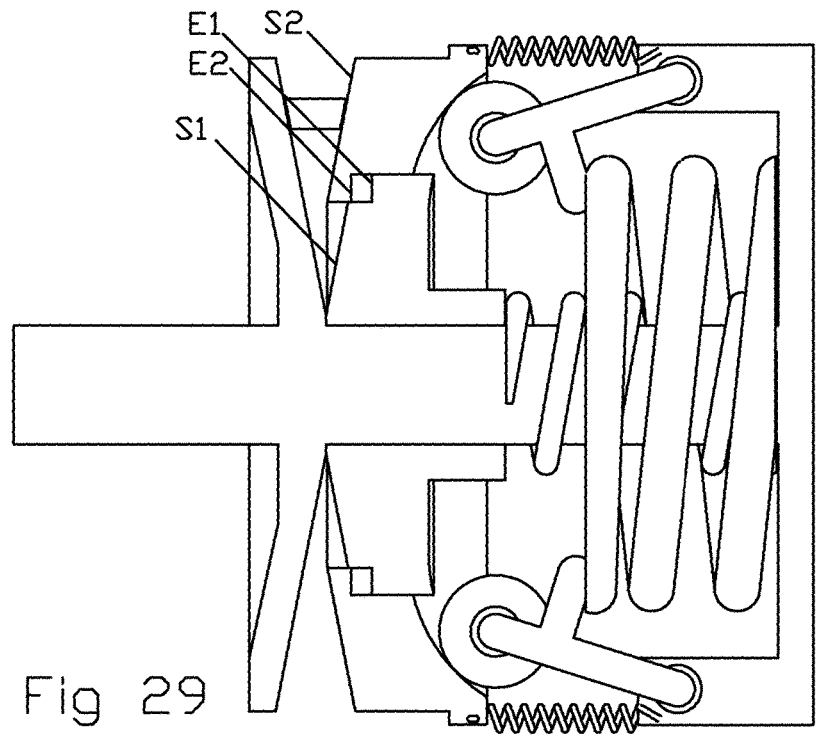
FIG. 29 shows a mechanical control mechanism for the control of the effective diameter of the belt on the driven (preferably) pulley of the third embodiment. The belt runs at a high radius.

Mechanical Control Over the Driven Pulley:

FIG. 29 shows a mechanism suitable for the driven pulley of scooters etc. A big spring pushes, through a linkage, the movable half of the driven pulley to the left. Initially the big spring acts, through the rollers, on the outer section of the right half of the pulley and the belt runs at big radiuses and abuts on the conical surface S2. As the belt goes to smaller radiuses, the outer section moves to the right. Then the surface E2 of the outer section abuts on the surface E1 of the inner section and pushes the inner section to follow the outer section at its motion to the right. Then the rollers pass to the inner section. Then the belt passes to the inner section.

Figure 30:
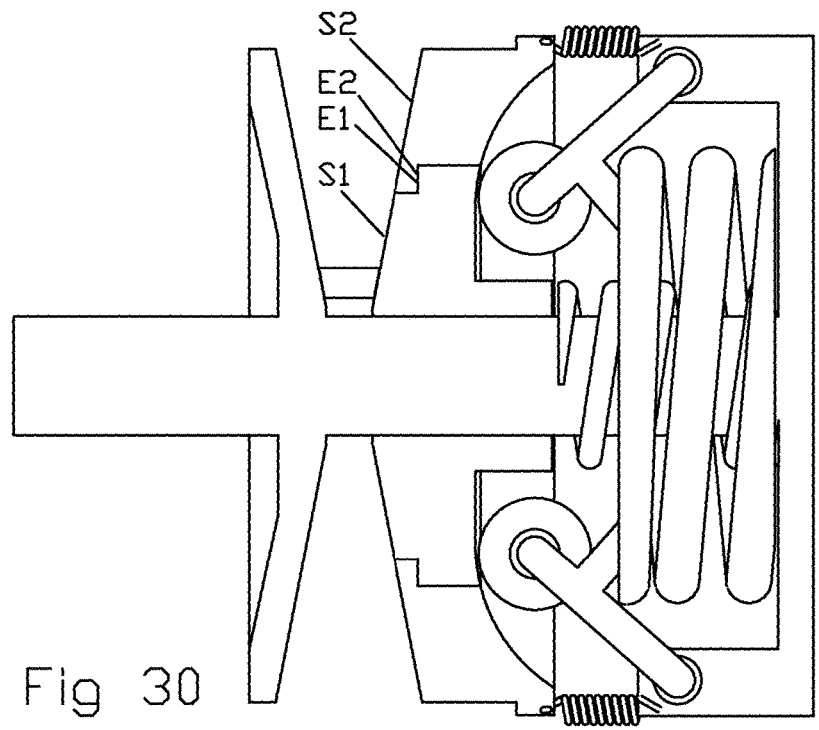
FIG. 30 shows the mechanical control mechanism of FIG. 29 with the belt running at the lowest radius.
Figure 31:
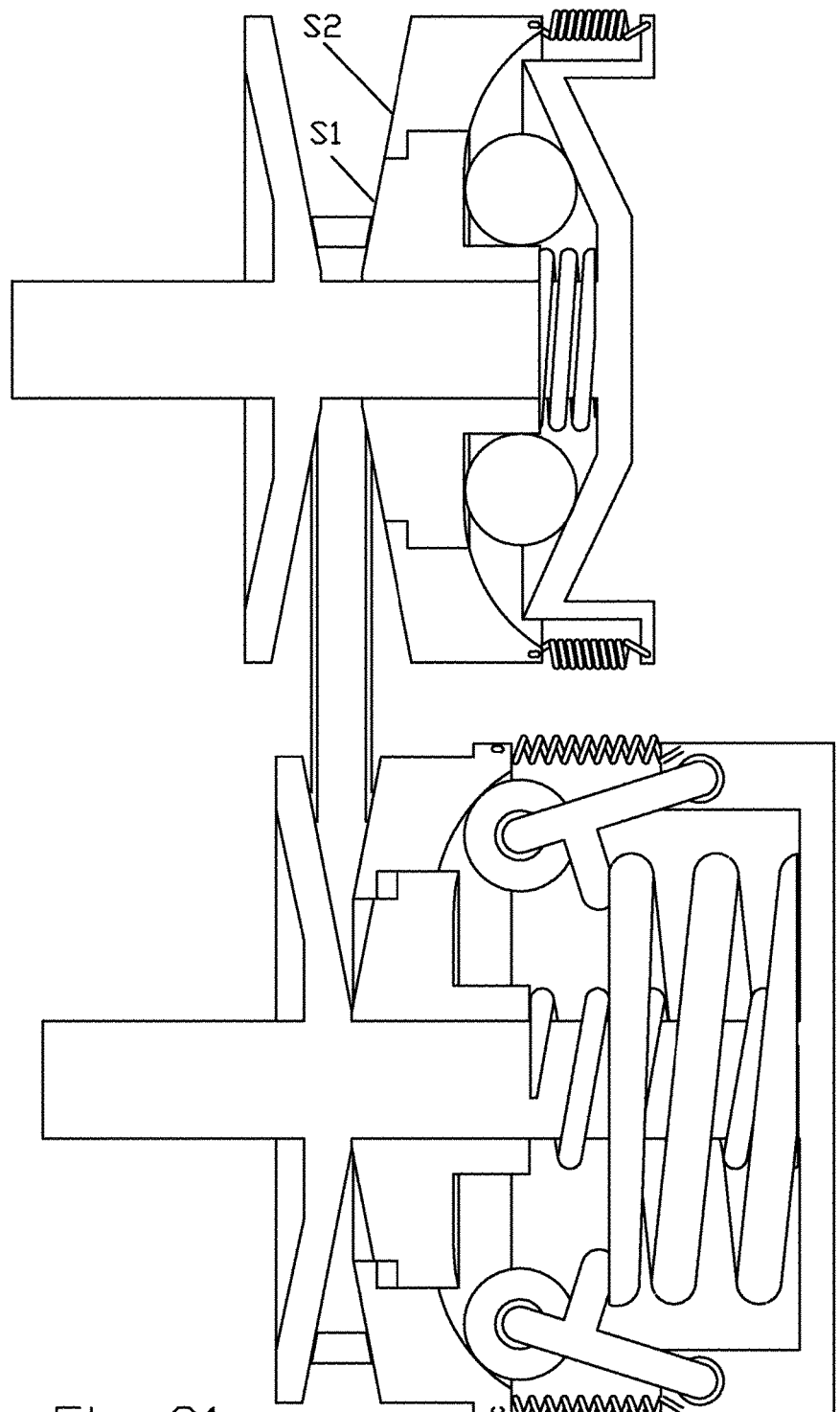
FIG. 31 shows the third embodiment with a mechanical control mechanism like that of FIG. 27 on the drive pulley, and with a mechanical control mechanism like that of FIG. 29 on the driven pulley. Its simplicity fits with various applications like, for instance, the scooter CVTs.

In FIG. 30 the belt is at a small radius. The big spring through the rollers pushes the inner section to the left. The two small springs at the sides keep the outer section at its leftmost position relative to the inner section. After the belt has passed from the S1 conical surface to the S2 conical surface, the big spring, through the rollers of the linkage, push the outer section to the left. The small central spring pushes the inner section to the left.

Electrical Control:

In the arrangement of FIGS. 25 and 26, an electromagnet can replace the liquid in the space V1. At small effective radiuses of the belt, the electromagnet keeps the inner section of the left half of the pulley locked onto the outer section of the left half of the pulley, at its rightmost position. When the effective radius of the belt is increased and the belt is abutting onto the outer section, the electromagnet is de-activated allowing the displacement of the inner section, relative to the outer section, to the left.

Applications

It fits with the CVT of trucks, of agricultural tractors, of cars, of scooters etc.

Due to each high Transmission Gear Ratio Range it can be used between the crankshaft of an engine and the auxiliary devices of the engine (like electric generator, air conditioning, supercharger, hydraulic pump etc) to reduce the parasitic friction.

It may also be used for the big reduction required between a turbine and the propeller of an airplane or helicopter.

It may also be used for the big increase of the revs between a wind turbine and its electric generator, and for keeping the electric generator revs at the optimum.

What is claimed is:

1. A continuously variable transmission comprising at least:
    a first shaft rotating about a rotation axis;
    a first conical pulley on the first shaft, the first conical pulley comprising two conical halves displaceable relative to each other along the rotation axis;
    a second shaft;
    a second conical pulley on the second shaft;
    a belt engaging the first conical pulley and the second conical pulley transferring power between the first shaft and the second shaft, the belt abutting on the two conical halves is running at an effective radius (R) on the first conical pulley, with the effective radius (R) varying from a minimum (Ri) to a maximum (Ro);
    wherein the one conical half of the first conical pulley comprising an inner section and an outer section displaceable relative to each other along the rotation axis, the inner section comprising a working conical surface (S1), the outer section comprising a working conical surface (S2),
    wherein at a displacement of the inner section relative to the outer section the two working conical surfaces (S1) and (S2) fit/match with each other enabling a smooth transition of the belt from the (S1) working conical surface to the (S2) working conical surface and vice versa, during the smooth transition the belt is abutting simultaneously onto both working conical surfaces (S1) and (S2), wherein after said smooth transition, and with the belt no longer abutting simultaneously on both working conical surfaces (S1) and (S2), the one section can be displaced relative to the other section making space/room for the two conical halves of the first conical pulley to further approach each other without collision,
    thereby expanding the range of available effective radiuses (R) the belt is running on the first conical pulley,
    thereby enabling a wider range of transmission ratios between the first shaft and the second shaft.

2. A continuously variable transmission according claim 1 wherein:
    the first conical pulley is such that it allows a difference between the maximum effective radius (Ro) and the minimum effective radius (Ri) bigger than $0.5*W*\tan(F)$, wherein W is an effective width of the belt along the rotation axis and F is an angle of the first conical pulley.

3. A continuously variable transmission according claim 1 wherein:
    the first conical pulley is such that it allows a difference between the maximum effective radius (Ro) and the minimum effective radius (Ri) bigger than $0.55*W*\tan(F)$, wherein W is an effective width of the belt along the rotation axis and F is an angle of the first conical pulley.

4. A continuously variable transmission according claim 1 wherein:

the first conical pulley is such that it allows a difference between the maximum effective radius (Ro) and the minimum effective radius (Ri) bigger than 0.6*W*tan (F), wherein W is an effective width of the belt along the rotation axis and F is an angle of the first conical pulley.

5. A continuously variable transmission according claim 1 wherein:
at a position of the inner section relative to the outer section the working conical surface on the inner section fits with the working conical surface of the outer section forming a substantially stepless conical surface enabling the smooth transition of the belt from the inner section to the outer section when the effective radius increases, and from the outer section to the inner section when the effective radius decreases.

6. A continuously variable transmission according claim 1 wherein:
a control mechanism controls the axial displacement of the inner section relative to the outer section.

7. A continuously variable transmission according claim 1 wherein:
the two sections of the one half of the first conical pulley being telescopically movable with respect to each other, at smaller effective radiuses the belt abuts onto the working conical surface (S1) of the inner section, at bigger effective radiuses the belt abuts onto the working conical surface (S2) of the outer section.

8. A continuously variable transmission according claim 1 wherein:
the second conical pulley comprises two conical halves displaceable relative to each other along a rotation axis of the second shaft.

9. A continuously variable transmission according claim 1 wherein:
the first conical pulley is such that the achievable displacement of the one conical pulley half relative to the other conical pulley half is substantially wider than the width of the belt.

10. A continuously variable transmission according claim 1 wherein:
the second conical pulley has a similar structure as the first conical pulley, comprising two conical pulley halves with the one conical pulley half having two sections telescopically arranged.

* * * * *